United States Patent
Clarke et al.

(10) Patent No.: US 7,251,540 B2
(45) Date of Patent: Jul. 31, 2007

(54) METHOD OF ANALYZING A PRODUCT

(75) Inventors: Burton R. Clarke, Cuba, IL (US); Kermit H. Dove, Jr., Escondido, CA (US); Anthony J. Grichnik, Peoria, IL (US); Michael Seskin, Cardiff, CA (US); Danny L. Weis, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 335 days.

(21) Appl. No.: 10/922,320

(22) Filed: Aug. 20, 2004

(65) Prior Publication Data

US 2005/0055176 A1 Mar. 10, 2005

Related U.S. Application Data

(60) Provisional application No. 60/496,547, filed on Aug. 20, 2003.

(51) Int. Cl.
*G05B 13/02* (2006.01)
*G06F 19/00* (2006.01)
*G06F 15/00* (2006.01)

(52) U.S. Cl. .................... 700/108; 700/28; 700/97; 700/101; 700/110; 702/81; 702/84; 702/182

(58) Field of Classification Search ............ 700/9, 700/11, 28–31, 33, 36, 44, 45, 48, 49, 51, 700/95, 97, 101, 103, 104, 108–111, 173–175, 700/177; 702/81–84, 182
See application file for complete search history.

(56) References Cited

U.S. PATENT DOCUMENTS

| 4,875,002 A | * | 10/1989 | Sakamoto et al. .......... 324/73.1 |
| 4,901,242 A | * | 2/1990 | Kotan ........................ 700/108 |
| 5,465,221 A | | 11/1995 | Merat et al. |
| 6,138,109 A | | 10/2000 | Grichnik et al. |
| 6,256,619 B1 | | 7/2001 | Grichnik |
| 6,622,059 B1 | * | 9/2003 | Toprac et al. ............... 700/121 |
| 2003/0182252 A1 | | 9/2003 | Beinglass et al. |

* cited by examiner

*Primary Examiner*—Leo Picard
*Assistant Examiner*—Sean Shechtman
(74) *Attorney, Agent, or Firm*—W. Bryan McPherson; Finnegan, Henderson, Farabow, Garrett & Dunner

(57) ABSTRACT

The present invention includes a system and method configured to analyze a performance of a product. The product has associated process and performance characteristics. The method includes the steps of establishing a plurality of process characteristics associated with the product, establishing an analysis relationship between the process characteristics and the performance characteristic, and analyzing the performance characteristic of the product in response to the relationship.

22 Claims, 2 Drawing Sheets

METHOD OF ANALYZING A PRODUCT

This application claims the benefit of prior provisional patent application Ser. No. 60/496,547 filed Aug. 20, 2003.

TECHNICAL FIELD

This invention relates generally to a method and system of predicting a performance of a product, and more particularly to a method and system of predicting a performance of a product in response to process characteristics associated with the product.

BACKGROUND

Product testing is difficult and expensive. Large products may require separate test facilities (buildings, equipment, etc.) to perform the testing. Therefore, when a product is assembled it must be scheduled for testing, moved between facilities, and then tested. If the product does not meet desired performance criteria it must be moved into a separate maintenance area or back into the assembly area for analysis. The cause of the failure must then be determined and resolved. Current trouble shooting techniques are limited in effectiveness and usually based on educated guesses rather than actual causal determinations. Therefore, the failed product may be modified (e.g., portions of the product re-assembled) based on the recommendations of the trouble shooting procedure, but the modification may be ineffective, in which case the product again fails the follow-up test and the trouble shooting process is repeated. This type of repetitive testing and analysis is time consuming and expensive.

In addition, if the products being tested are small in nature, the inability to determine the cause of product testing failures may be expensive, especially if there is a high volume of the product. Even if the product does not go through extensive after assembly testing it may still suffer from warranty issues associated with performance failures. The inability to predict these failures prior to shipping the product leads to unnecessary and undesired cost.

The present disclosure is directed towards solving one or more of the problems set forth above.

SUMMARY OF THE INVENTION

In one aspect of the present invention, a computer-based method of analyzing a performance of a product is disclosed. The product has a performance characteristic. The method includes the steps of establishing a plurality of process characteristics of the product, establishing a plurality of potential relationships between at least a portion of the process characteristics and the performance characteristics, establishing a first evaluation technique associated with the plurality of relationships, down selecting said potential relationships in response to the first evaluation technique, establishing a second evaluation technique associated with the down selected potential relationships; establishing a performance relationship between said process characteristics and said performance characteristic in response to said down selected potential relationships and said second evaluation technique; and analyzing said performance characteristic of said product in response to said performance relationship.

DETAILED DESCRIPTION

The present disclosure includes a system and method of analyzing the performance of a product. A product may include any entity that includes multiple parts assembled together. A part in this context may be a single part, a component, or an assembly having multiple parts. In one embodiment, a product may be any process or service having multiple subcomponents or subprocesses that form the process or service. Non-limiting examples of products includes automobiles, aircraft, boats, appliances, electronics, engines, machinery, etc., or any sub-components, or assemblies thereof.

The product and/or parts of a product may have associated process characteristics. A process characteristic may be described as including any characteristic associated with the assembly of the product. For example, process characteristics may include the amount of torque applied to a bolt, the gap on a spark plug, the clearance around a part, etc. Process characteristics may also include tolerances, e.g., a spark plug gap of 3 millimeters plus or minus 1 millimeter, a torque of 30 ft-lbs +/−3 ft-lbs (or 10%) etc. Process characteristics may include a process test associated with the product. For example, the process characteristic may be the airflow through a portion of the product or part. That is, the part is to be assembled or positioned appropriately such that a certain amount of airflow is permitted.

The product, or a portion thereof, has one or more performance characteristics. A performance characteristic may include any characteristic indicative of the performance or quality of the product. For example, the performance characteristics associated with an engine may include the fuel economy, operating temperature, vibration, emissions, or combinations thereof.

Figure 1:
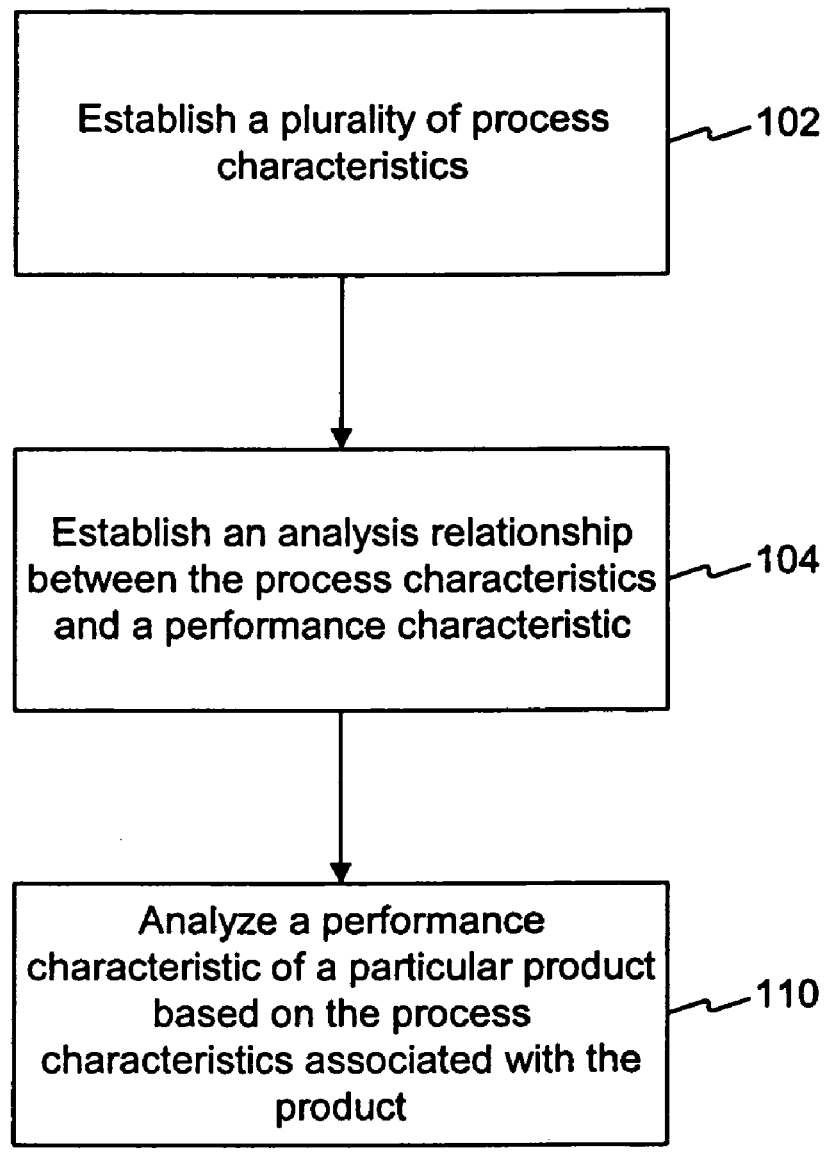
FIG. 1 is an illustration of one embodiment of a method of analyzing the performance of a product.
Figure 2:
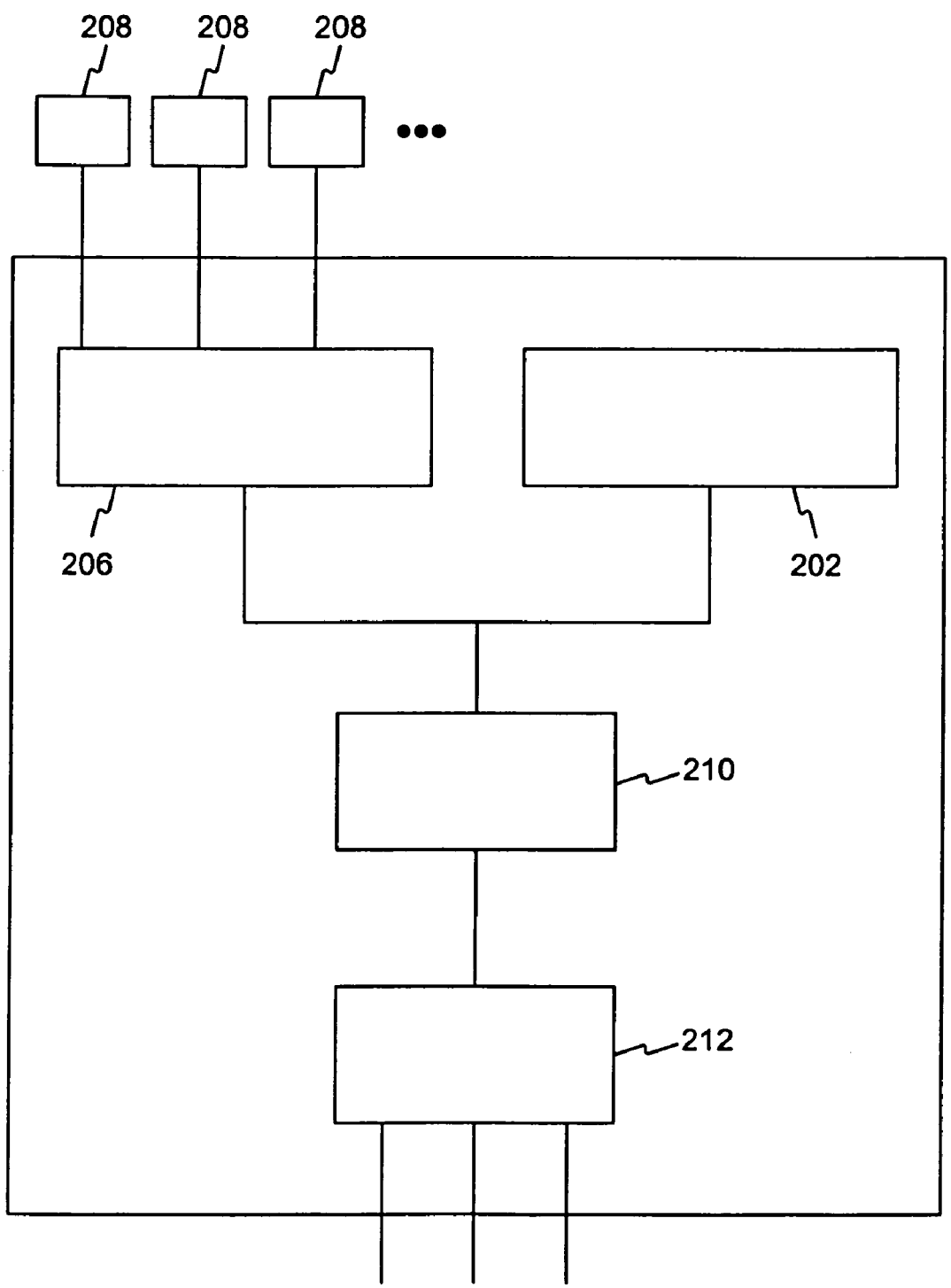
FIG. 2 is an illustration of one embodiment of a system configured to analyze the performance of a product.

FIG. 1 illustrates a method of analyzing a performance of a product associated with the present disclosure. The method includes the steps of establishing a plurality of process characteristics of the product, establishing a relationship between the process characteristics and one or more of the performance characteristics of the product, and analyzing the performance of the product in response to the relationship. In particular, in a first control block 102, a plurality of process characteristics of a product are established. In one embodiment the process characteristics may include every form of assembly instruction, dimensional characteristic, or in-process characteristic associated with the product being assembled, or a portion thereof. An in-process characteristic may be described as any characteristic that occurs prior to the completion of the product for distribution to a customer. A dimension characteristic is a characteristic associated with a direct measurement of a part (such as its length, mass, volume, etc.) that results from a manufacturing process being applied to that part. Process characteristic may include the result of an in-process activity that indirectly measures the outcome of a manufacturing process (such as an assembled length, an assembled clearance, an effective flow rate, a total current drop, etc.). Establishing the process characteristics may involve acquiring the characteristics from a database, or receiving them in real-time from assembly machines or manual operator inputs. In a second control block 104, a relationship between at least a portion of the process characteristics and a performance characteristic of the product may be established. This relationship will be referred to as a performance relationship.

The performance relationship may be established by analyzing previous process characteristics of assembled products of the same type and the associated performance characteristics. The type of analysis used to establish the relationship is implementation dependant and may vary as a function of the data provided to the algorithm(s) establishing the relationship, and/or the information being requested (e.g., the product analysis request).

Establishing the performance relationship includes establishing a plurality of potential performance relationships between at least a portion of the process characteristics and a performance characteristic. The potential performance relationships may include one or more neural network models. For example, a plurality of neural network models may be established representing different combinations of the process characteristics and the performance characteristic. In one embodiment, neural network models representing every combination of process characteristics and the performance characteristic may be established. The type of neural network models used may vary among the potential relationships depending on the objective of the particular relationship, and may include back propagation, feed forward models, cascaded neural networks, hybrid neural networks etc. The number of neural network models established is implementation dependent, and may vary based on the number and type of process characteristics. Once process characteristics and performance characteristic(s) are selected, the neural network models may be trained. Training may be based on data from a plurality of previously assembled products. In one embodiment, the process characteristics associated with the previously assembled products may be delivered to the models as inputs. The models may deliver an output associated with the predicted performance characteristic of the product based on the specific input process characteristics. In the case of the back propagation network, the predicted performance characteristic may be compared to the actual performance of the previously assembled product, and the difference, or error, may be used to modify the of the neural network model. For example, as is known in the art, the error may be used to modify the weighted interconnections within a back propagation network.

The training process may continue until a desired criteria is met, e.g., accuracy, time, or number of training iterations etc. In one embodiment, one or more evaluation techniques may be used to evaluate the performance of the potential relationships. Examples of evaluation techniques may include R difference, $R^2$, confidence level correlations, error correlations, average error, maximum errors etc. For example, these evaluation techniques may include performing a series of first and second moment statistical tests (such as mean difference, error difference, R or correlation difference, $R^2$ or the absolute value of the correlation difference, etc.). The evaluation phase may be performed by providing the neural networks with data they have not been exposed to. For example, the process characteristics and associated performance characteristic of previously assembled products may be separated into a training set of data and a test set of data. In one embodiment, the training set may include 80% of the available data, and the test set the other 20%. After training the neural networks with the training data set, the models may be evaluated using the test data set. The resulting outputs of the models may then be compared using one or more of the evaluation techniques. For example, an accuracy level for each model may be established based on how well the model achieved its desired objectives (e.g., how well it predicts the performance based on the given process characteristics. The accuracy levels associated with the models may then be compared with each other. In one embodiment, only the models performing the best are selected for further analysis (e.g., the top 10 out of 100 models). In another embodiment, only the models surpassing a desired evaluation criteria (e.g., accuracy threshold) may be selected for further analysis. For example, if 15 neural networks surpass an accuracy threshold, all 15 may be selected for further analysis, or the top 10 of the 15 may be selected for further analysis. If only 5 surpass the accuracy threshold, then all 5 may undergo further analysis. If no models meet the evaluation criteria, e.g., surpasses the accuracy threshold, then no models are selected for further analysis. If no models are adequate based on the evaluation criteria, then the step of establishing the models may be repeated by acquiring additional data, using different process characteristics and/or using different combinations of process characteristics. The inability to establish an adequate performance relationship between the process characteristics and the performance characteristic may be due to a lack of data available to adequately represent the correlation or the appropriate type of data was not being used. If less than all of the process characteristics were used to initially develop the relationship, then characteristics that are relevant to the relationship may have been left out.

As discussed above, one potential performance relationship may be selected as the appropriate relationship based on most closely meeting the evaluation criteria established. However, there may be situations where, due to the number or type of process characteristics, performance characteristic, and/or the number of relationships being established and evaluated, that it is not effective to use the most rigorous evaluation techniques on each of the potential relationships being evaluated, e.g., it would be unmanageable from a time and/or processing perspective. Therefore, less rigorous (or time consuming) evaluation techniques may be used to initially down select the potential relationships to the top candidates. This initial down-selection minimizes the time that spent on clearly inadequate models (relationships), so that the process resources etc., may be focused on analyzing the more likely candidates. Then more rigorous evaluation techniques may be used to analyze the remaining models.

A second evaluation phase may include using evaluation techniques such as histogram analysis, comparison of actual and predicted values for mean standard deviation, evaluation of the associated skewness and kurtosis of the relationships, evaluation of the actual, predicted, and residual values for normality, and/or evaluation based on the Wilks-Shapiro test. One or more of these techniques, or an analogous technique may be used to evaluate the performance of the remaining potential relationships. For example, these evaluation techniques may include performing a series of third and fourth moment statistical tests (such as histogram analysis, comparison of actual and predicted values for mean standard deviation, evaluation of the associated skewness and kurtosis of the relationships, evaluation of the actual, predicted, and residual values for normality, and/or evaluation based on the Wilks-Shapiro test, etc.). In one embodiment, the relationship performing the best, as determined via the evaluation techniques, may be selected to use for the analysis of the products. Alternatively, the evaluation techniques(s) may be used to further down select the potential relationships. For example, the potential relationships may be further down selected from the top 10 to the top 5, or the top half of the remaining relationships may be utilized, etc. If none of the relationships meet the desired performance criteria then, as before, the method of establishing a relationship between the process characteristics and a performance characteristic may be repeated by acquiring additional data, using different process characteristics and/or different combinations of process characteristics.

In one embodiment, a third, more thorough evaluation of the remaining models may be further performed, using more robust evaluation techniques. The third evaluation technique(s) may include hypothesis testing techniques such as T and F test, and comparing the results with an associated p-value, e.g., 0.05. These evaluation techniques may be used to evaluate the performance of the remaining potential relationships and down select to one relationship that will be used to analyze the product(s). If none of the potential relationships meet an evaluation criteria then, as before, the method may be repeated by acquiring additional data, using different process characteristics and/or different combinations of process characteristics. If multiple relationships still remain as strong candidates, additional evaluation phases may be performed until one relationship is selected.

In a third control block 110, the established performance relationship may be used to analyze a performance characteristic of a particular product based on the process characteristics associated with that product. For example, the established (or selected) relationship may be used to predict the performance characteristic (e.g., fuel economy, or vibration characteristic etc.) of the product (e.g., engine), based on the particular values of the process characteristics associated with the product. Therefore, upon completion of physically assembling the product, the product performance may be predicted. If the predicted product performance does not meet a desired performance criteria, then modifications to the product may be made. For example, if the analysis of a particular engine indicates it will achieve 24 miles to the gallon instead of the desired 27 miles to the gallon then modifications may be made to bring the engine within the desired criteria. In this manner, the performance of the product may be predicted without testing the product.

The analysis may include identifying which process characteristics should be modified in order to bring the performance characteristic within a desired performance criteria. For example, a back propagation network includes multiple weighted interconnections between the input factors and the output. The weighted interconnections may be reviewed and correlated with the input process characteristics. In this manner, the process characteristics having more relevance (e.g., a higher weighting value) may be identified. If the desired performance criteria is not achieved, then the values of the process characteristics deemed more relevant may be reviewed to determine if they were outside a desired range. If the values of the process characteristics were outside the desired range, then the process characteristic may be modified.

Therefore, the method described above, with reference to FIG. 1, may be used to establish a relationship between the process characteristics of the product and one or more of the performance characteristics. In addition, a relationship may be established for other performance characteristics, such as emission profiles, temperature profiles, vibration profiles etc. Then, a system relationship associated with the overall product performance may be established based on these individual performance relationships. The system relationship may be described as a relationship between the process characteristics, and all of the performance characteristics desired to be evaluated.

Analysis techniques such as genetic algorithms may be used to establish the system relationship based upon the individual performance relationships. For exemplary purposes, assume a relationship is established for each of the desired performance characteristics (e.g., fuel economy, vibration, temperature, emissions, etc.). Each relationship may identify the desired process characteristics relevant to a particular performance characteristic of the product. One process characteristic may be more relevant for a particular performance characteristic than another process characteristic. In addition, one process characteristic maybe more relevant to one performance characteristic than it is to another performance characteristic. For example, a torque value of 19 ft-lbs on a particular bolt may result in low fuel economy, improved vibration characteristics, and no noticeable effect on operating temperature. The relationships may not have consistent values for the process characteristics. Therefore, a system relationship may be developed for the product that integrates the individual relationships. The system relationship will identify values for the process characteristics that obtain a balance of achieving the performance characteristics. Genetic algorithms may be used to develop this system relationship. The genetic algorithm enables the movement of process characteristic values within established ranges to reduce the fuel consumption, increase the power, and reduce the temperature and vibration. In effect, the genetic algorithm enables a balance to be obtained such that the desired performance characteristics may be obtained for a given set of process characteristics.

Through the use of the genetic algorithm, the individual relationships may be adjusted to achieve a balanced overall performance associated with the input process characteristics and the performance characteristics. For example, an initial table associated with a genetic algorithm may look like:

| Performance | Process characteristics | | | | | |
|---|---|---|---|---|---|---|
| Characteristics | A | B | C | D | ... | HH |
| Power | 2 | 4 | 3 | 27 | | 16 |
| Fuel | 2.2 | 4 | 9 | 16 | | 31 |
| Temp | 3 | 4.4 | 2.7 | 4 | | 16 |
| Vibration | 7 | 3.8 | 16 | 12 | | 16 |
| Ultimately | 2.1 | 4.2 | 12 | 14 | | 20 |

Once analysis using the genetic algorithm is complete, the resulting system relationship may be used in several ways. The system relationship may be used to identify the process characteristics that are relevant to the overall desired product performance. That is, if the products are manufactured based on the identified process characteristics, then the desired performance parameters will be achieved. Further analysis may then be performed to improve the identified process characteristics (or the ability to achieve the identified characteristics) in light of their relevance to the overall system performance. In addition, the system relationship may be used to predict the performance of an assembled product based on the associated process characteristics. In this manner, if the product performance does not meet desired criteria, one or more of the process characteristics may be modified to improve the performance. For example, if a bolt was tightened to 27 ft-lbs instead of 30 ft-lbs, then the bolt can be tightened further. In addition, the bolt may be within an acceptable range (e.g., 29 ft-lbs where the criteria is 30 ft-lbs +/−2 ft-lbs) then the bolt can be further tightened to 30 ft-lbs if the system indicates that the adjustment is necessary based on the other particular process characteristics.

In one embodiment, the method may be used to optimize one specific performance characteristic. For example, if fuel economy is provided a higher priority than the other performance characteristics, then the system relationship may be developed to provide a higher fuel economy, even though some of the values for the other performance characteristics become less desirable.

In one embodiment, the system relationship may be used to predict the performance of multiple products, i.e., a group of products. For example, a distribution of process characteristics may be established based on existing process characteristics. This process characteristic distribution may then be delivered to the system relationship and the system relationship may establish a distribution of the associated performance characteristics. This performance characteristic distribution may then be used to determine the predicted pass rate of the group of products. For example, a pass rate may be defined as the distributed performance variable exceeding a particular threshold value. Therefore, the min/max distribution of the performance characteristic may be compared to the threshold value of the performance characteristic in order to predict the pass rate of the group.

In one embodiment, a system 202 may be configured to analyze the performance of a product having performance characteristic. The system 202 may include a memory 204 configured to store a plurality of process characteristics associated with the product, an input interface 206 configured to receive a plurality of process characteristics from one or more external devices 208; and a controller 210 configured to receive one or more process characteristics from at least one of said memory and said input interface, establish a plurality of potential relationships between at least a portion of the process characteristics and the performance characteristic, establish a first evaluation technique associated with said plurality of relationships, down select the potential relationships in response to the first evaluation technique, establish a second evaluation technique associated with the down selected potential relationships, establish a performance relationship between the process characteristics and the performance characteristic in response to the down selected potential relationships and the second evaluation technique, and analyze the performance of the product in response to said performance relationship.

The system 202 may analyze the performance of the product based on the process characteristics that have been stored in memory 204 or received through the input interface 206. In this manner, the system 202 may react to characteristics that have been pre-determined and stored in memory, or that are dynamically received through the input interface. In one embodiment, information received through the input interface may be stored in the memory 204 for later processing.

The input interface 206 may receive information from a user, or devices 208 such as other computer systems or machines. In this manner, the input interface 206 may receive inputs directly from the machine performing the activity or from another computer system that has processed and/or stored the results of the process characteristics. In one embodiment, the system 202 may include an output interface 212 so that the results of the analysis, or information associated with the results, may be communicated to a user, or to another device, such as a computer system or a machine engaged in the activity associated with the product. The input interface 206 and the output interface 212 may be the same device. The input interface 206 and the output interface 212 may connect to the same controller 210, different controllers 210, or a combination thereof.

INDUSTRIAL APPLICABILITY

The present invention includes a system and method configured to analyze a performance of a product. The product has associated process and performance characteristics. The method includes the steps of establishing a plurality of process characteristics associated with the product, establishing an analysis relationship between the process characteristics and the performance characteristic, and analyzing the performance characteristic of the product in response to the relationship.

In one embodiment, the product is an engine. The process characteristics may include bolt torque values, part clearances, or other characteristics of assembling or preparing a product etc. Performance characteristics may include characteristics such as fuel economy, emissions, vibration characteristics, and temperature characteristics. A repository of process and performance characteristics may be created based on previous products that have been assembled. This repository may be accessed and used to establish a relationship between the process characteristics and one or more of the performance characteristics.

In one embodiment, the performance relationship may be established through establishing multiple neural network models that represent a relationship between the process characteristics and the performance characteristic(s), and then evaluating the models to determine which model best represents the actual relationship. The models may be evaluated by using a hierarchy of evaluation techniques to down select the neural network models. The selected neural network model may them be used to analyze the performance characteristics of the product.

In one embodiment, the established relationship(s) may be used to identify which process characteristics are most relevant to the product performance (e.g., one or more of the performance characteristics). This information may be used in several ways. For example, this information may be used to provide guidance on product upgrades. If a particular process characteristic is deemed important for good fuel economy, yet is difficult to achieve, then that process characteristic may be redesigned to improve assembly accuracy to avoid the assembly problems. To further illustrate, there may be 50 potential process characteristics that may be used to establish a relationship for predicting the performance characteristics fuel economy, emissions, vibration and temperature characteristics. Four analysis relationships (one of each performance characteristic) may be established and then integrated to form the system relationship. Assume each established relationship uses 20 of the process characteristics as input variables, and that there are 15 process characteristics not used by any of the four performance relationships. In reality the number of process characteristics used may vary from one relationship to the next. Assume that 5 process characteristics are commonly used by each relationship, 10 process characteristics are not used by any relationship, 10 process characteristics are shared only by the relationships associated with the fuel economy and emissions characteristics. In addition, 10 process characteristics are shared by the relationships associated with temperature characteristics and vibration characteristics, and the remaining process characteristics are used only for particular relationships. The conclusions that may be drawn from this are that, if resources are limited, money may be spent on improving issues associated with the quality of the 5 common process characteristics, since they impact each performance characteristic, and thereby, may have the most impact in the overall achievement of performance objectives. In addition, little or no money should be spent on issues associated with the quality of the 15 unused process characteristics, since they have no bearing on the overall achievement of any performance characteristics, provided that these remain in reasonable statistical control as initially observed.

In addition, when the performance of a particular product is being simulated, if the performance criteria are not met, process characteristics out of range may be identified and prioritized based on the relevance of the process characteristic. In this manner, recommendations may be provided regarding what modification should be made to enable the product to meet the desired performance criteria. In addition, even if the process characteristics are within desired ranges, if the desired performance characteristics are not being achieved, the system may determine which modifications should be made to the process characteristics to bring the product within desired guidelines. Once the system has established recommendations regarding process characteristic modifications, the system may re-simulate the performance of the product to verify the modifications will produce the desired results.

In one embodiment, there may be a computer system configured in a test cell (for example) that is able to receive values associated with all available process characteristics of a product. The process characteristics may be stored in a single repository, or stored in multiple computers associated with the machines that perform the assembly of the engine. The process characteristics received may include test results (e.g., the output air flow of an air duct). The received process characteristics may have been manually entered into the system. Alternatively the computer may automatically receive the process characteristics electronically from the machines associated with the assembly. The computer system may perform the performance analysis for the product based on the process characteristics. If the performance criteria are not met, then the system may identify modifications to the process characteristics. In one embodiment, the recommendations may be provided to a person associated with product assembly (e.g., through a computer display etc.), or the computer system may forward the recommendation to an electronic controller of the machine associated with the process characteristic needing modification. The machine may then automatically make the adjustment. For example, a bolt may be automatically tightened an extra ½ ft-lbs. In this manner, the system may be a closed loop, or semi-closed loop system.

In one embodiment, the system relationship that is established will indicate what the desired process characteristics are in order to achieve the desired performance characteristics. These process characteristics then may be used to recalibrate any machines performing the assembly. In one embodiment, the desired process characteristics may be delivered to the appropriate machines in an automated manner. For example, there may be a calibration file that includes all of the process characteristics associated with the product. When a value of a process characteristic is updated in the file, the value may be automatically delivered to the appropriate machine to re-calibrate the machine in light of the new value. The machines associated with the process characteristics may be included in the calibration file or they may be in a separate file. Therefore, when it is determined that a desired torque value for a bolt is 28 ft/lbs, the desired torque value may be stored in the calibration file, and also delivered to a control module associated with the automated air gun that torques down that particular bolt. In this manner, when the relationship is initially created, and the desired process characteristics are established, the desired values may be stored in a calibration file, and delivered to the associated machines. Alternatively, whenever the machine begins operation, it may access the calibration files to determine if any updates have been made. In addition, when the calibration file is updated the appropriate machine controllers may also be updated. For example, as a turbine is being assembled, there is a machine that controls the turbine tip clearances. The machine may receive an update from another computer (the one that performed the above analysis) that indicates that the tip clearances should now be 2.2 cm instead of the 2.1 cm previously used.

In one embodiment, when process characteristics are recalibrated and dynamically delivered to the associated machines, the characteristics may include an associated start time. The start time may be the time at which the new process metrics should be used. In this manner, the assembly process as a whole is able to track which parts/engines are using the previous process characteristic, and which ones are using the new process characteristics.

In one embodiment, the calibrated process characteristics may be delivered (manually or automatically) to a supplier, or a machine controlled by a supplier to further analyze the products assembled by the supplier. In addition, "what if" scenarios may be performed using the established system relationship. For example, it may be desirable to try and meet all of the performance characteristics and maximize fuel economy. Therefore, the genetic algorithm may be manipulated to prioritize fuel economy.

In one embodiment, a relationship of the distribution of process characteristics with respect to the performance characteristics may be established. This distribution relationship may be used to establish predicted pass rate information associated with a group of products being assembled. The pass rate information may be used to set production rates, or set production cost etc. associated with the products (i.e., adjust business processes/prices etc.).

What is claimed is:

1. A computer based method of analyzing a performance of a product, said product having a performance characteristic, comprising the steps of:
   establishing a plurality of process characteristics of said product;
   establishing a plurality of potential relationships between at least a portion of said process characteristics and said performance characteristic;
   establishing a first evaluation technique associated with said plurality of potential relationships;
   down selecting said potential relationships in response to said first evaluation technique;
   establishing a second evaluation technique associated with said down selected potential relationships;
   establishing a performance relationship between said process characteristics and said performance characteristic in response to said down selected potential relationships and said second evaluation technique; and
   analyzing said performance characteristic of said product in response to said performance relationship.

2. A method, as set forth in claim 1, wherein the step of analyzing said performance characteristic, further comprises the step of predicting said performance characteristic in response to said performance relationship and said process characteristics.

3. A method, as set forth in claim 1, wherein said product includes a plurality of parts, said parts being assembled to form said product, and further wherein said process characteristics include actual part process characteristics and desired part process characteristics, and at least a portion of said parts have associated desired part process characteristics.

4. A method, as set forth in claim 3, further including the step of establishing said desired part process characteristics in response to said performance relationship.

5. A method, as set forth in claim 4, further including the step of automatically generating assembly instructions in response to said desired part process characteristics.

6. A method, as set forth in claim 5, further comprising the step of automatically programming at least one of a piece of assembly equipment and a piece of machining equipment in response to said desired process characteristics.

7. A method as set forth in claim 1, wherein the performance characteristic includes a plurality of performance characteristics, and further comprising the step bf establishing a plurality of performance relationships between said process characteristics and said plurality of performance characteristics, each of said performance characteristics having an associated performance relationship.

8. A method, as set forth in claim 7, further comprising the step of establishing a system relationship in response to said plurality of performance relationships.

9. A method, as set forth in claim 8, wherein the step of analyzing said performance characteristic further comprises the step of analyzing product performance in response to said process characteristics and said system relationship.

10. A method, as set forth in claim 9, wherein said product includes a plurality of parts, said parts being assembled to form said product, and further wherein said process characteristics include actual part process characteristics and desired part process characteristics, and at least a portion of said parts have associated desired process characteristics.

11. A method, as set forth in claim 10, further including the step of establishing said desired part process characteristics in response to said system relationship.

12. A method, as set forth in claim 11, further including the step of automatically generating assembly instructions in response to said desired part process characteristics.

13. A method, as set forth in claim 12, further comprising the step of automatically programming an assembly equipment in response to said desired process characteristics.

14. A method, as set forth in claim 7, further comprising the step of establishing a priority of at least a plurality of said process characteristics with respect to at least one performance characteristic.

15. A method, as set forth in claim 7, further comprising the step of establishing a priority of at least a plurality of said process characteristics with respect to said performance of said product.

16. A method, as set forth in claim 1, wherein the step of analyzing said performance characteristic of said product, further comprises the step of predicting a pass rate of said product in response to said performance relationship.

17. A method, as set forth in claim 16 further comprising the step of establishing a production characteristic in response to said pass rate.

18. A method, as set forth in claim 17, wherein said production characteristic further includes at least one of a production rate and a production cost.

19. A method, as set forth in claim 8, wherein the step of analyzing said performance characteristic of said product, further comprises the step of predicting a pass rate of said product in response to said system relationship.

20. A method, as set forth in claim 19, further comprising the step of establishing a production characteristic in response to said pass rate.

21. A method, as set forth in claim 20, wherein said production characteristic further includes at least one of a production rate and a production cost.

22. A system configured to analyze a performance of a product, said product having a performance characteristic, the system corrmprising:
 a memory configured to store a plurality of process characteristics associated with said product;
 an input interface configured to receive the plurality of process characteristics from one or more external machines; and
 a controller configured to receive one or more process characteristics from at least one of said memory and said input interface, establish a plurality of potential relationships between at least a portion of said plurality of process characteristics and said performance characteristic, establish a first evaluation technique associated with said plurality of potential relationships, down select said plurality of potential relationships in response to said first evaluation technique, establish a second evaluation technique associated with said down selected potential relationships, establish a performance relationship between said plurality of process characteristics and said performance characteristic in response to said down selected potential relationships and said second evaluation technique, and analyze said performance of said product in response to said performance relationship.

* * * * *

UNITED STATES PATENT AND TRADEMARK OFFICE
CERTIFICATE OF CORRECTION

PATENT NO.        : 7,251,540 B2
APPLICATION NO.   : 10/922320
DATED             : July 31, 2007
INVENTOR(S)       : Clarke et al.

Page 1 of 1

It is certified that error appears in the above-identified patent and that said Letters Patent is hereby corrected as shown below:

In Column 8, Line 37, delete "them" and insert -- then --, therefor.

In Column 11, Line 23, delete "bf" and insert -- of --, therefor.

In Column 11, Line 26, delete "characteristics" and insert -- characteristic --, therefor.

In Column 12, Line 28, in Claim 22, delete "cormprising:" and insert --comprising: --, therefor.

Signed and Sealed this

Twenty-second Day of July, 2008

JON W. DUDAS
*Director of the United States Patent and Trademark Office*